US009631632B2

(12) United States Patent
Okuda

(10) Patent No.: US 9,631,632 B2
(45) Date of Patent: Apr. 25, 2017

(54) IMPELLER HAVING BLADE HAVING BLADE SURFACE MADE UP OF LINE ELEMENTS AND METHOD OF MACHINING THE IMPELLER

(71) Applicant: FANUC Corporation, Yamanashi (JP)

(72) Inventor: Shinji Okuda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 7 days.

(21) Appl. No.: 14/327,046

(22) Filed: Jul. 9, 2014

(65) Prior Publication Data

US 2015/0017009 A1    Jan. 15, 2015

(30) Foreign Application Priority Data

Jul. 11, 2013  (JP) .................................. 2013-145821

(51) Int. Cl.
*B23C 3/18* (2006.01)
*F04D 29/18* (2006.01)
*F04D 29/60* (2006.01)
*F04D 29/22* (2006.01)
*F04D 29/24* (2006.01)

(52) U.S. Cl.
CPC ................ *F04D 29/18* (2013.01); *B23C 3/18* (2013.01); *F04D 29/2222* (2013.01); *F04D 29/242* (2013.01); *F04D 29/60* (2013.01); *B23C 2265/08* (2013.01); *Y10T 29/49337* (2015.01)

(58) Field of Classification Search
CPC .. B23C 3/18; B23P 13/00; B23P 23/02; Y10T 29/49316; Y10T 29/49325; Y10T 29/49336; Y10T 29/49337; F04D 29/2216; F04D 29/2222; F04D 29/242; F04D 29/18

USPC ............................................. 29/889, 889.21
See application file for complete search history.

(56) References Cited

U.S. PATENT DOCUMENTS

| | | |
|---|---|---|
| 2,407,469 A | 9/1946 | Birmann |
| 2,480,807 A | 8/1949 | De Vlieg |
| 2,585,920 A | 2/1952 | De Vlieg et al. |
| 4,720,243 A | 1/1988 | Katayama et al. |
| 5,290,149 A | 3/1994 | Vieth |
| 5,391,024 A | 2/1995 | Levine et al. |

(Continued)

FOREIGN PATENT DOCUMENTS

| | | |
|---|---|---|
| DE | 102012206105 A1 | 10/2012 |
| FR | 912795 A | 8/1946 |

(Continued)

OTHER PUBLICATIONS

Decision to Grant a Patent mailed Dec. 2, 2014, corresponding to Japanese patent application No. 2013-145821.

(Continued)

*Primary Examiner* — Gregory Anderson
*Assistant Examiner* — Maxime Adjagbe
(74) *Attorney, Agent, or Firm* — Hauptman Ham, LLP

(57) ABSTRACT

A blade of an impeller has a blade surface made up of line elements. The line elements forming the blade surface are not parallel to each other. A relationship between a twist angle of the line elements and a distance between the origin and an intersection of a central line of the impeller and an extension line of a Z-axis projection line obtained by projecting each of the line elements onto a Z-axis projection plane is represented by a curve.

3 Claims, 13 Drawing Sheets

(56) References Cited

U.S. PATENT DOCUMENTS

| | | | |
|---|---|---|---|
| 6,340,287 B1 | 1/2002 | Eino | |
| 7,517,193 B2 * | 4/2009 | Higashimori | F04D 21/00 |
| | | | 416/185 |
| 2012/0046782 A1 | 2/2012 | Schulze et al. | |
| 2012/0263599 A1 | 10/2012 | Sugimura et al. | |

FOREIGN PATENT DOCUMENTS

| | | |
|---|---|---|
| GB | 586100 A | 3/1947 |
| JP | 61-109608 A | 5/1986 |
| JP | 4-54997 U | 5/1992 |
| JP | 8-254198 A | 10/1996 |
| JP | 10-6119 A | 1/1998 |
| JP | 2010-269417 A | 12/2010 |
| JP | 2013-215843 A | 10/2013 |
| WO | 91/03648 A2 | 3/1991 |
| WO | 2010/124959 A1 | 11/2010 |

OTHER PUBLICATIONS

Office Action in DE Application No. 102014109578.2 dated Mar. 15, 2016.

\* cited by examiner

RELATIONSHIP BETWEEN TWIST ANGLE $\alpha$ AND Z-AXIS DISTANCE Z

IMPELLER HAVING BLADE HAVING BLADE SURFACE MADE UP OF LINE ELEMENTS AND METHOD OF MACHINING THE IMPELLER

RELATED APPLICATIONS

The present application claims priority to Japanese Application Number 2013-145821, filed Jul. 11, 2013, the disclosure of which is hereby incorporated by reference herein in its entirety.

BACKGROUND OF THE INVENTION

1. Field of the Invention

The present invention relates to an impeller having such a blade surface shape that the blade surface of the impeller can be cut by a lateral surface of a rotating tool using a 4-axis machining machine having three linear axes and one rotation axis, and to a method of machining the impeller.

2. Description of the Related Art

FIG. 15 is a diagram illustrating an impeller having a conventional general blade. A blade surface 3 of an impeller 1 has a 3-dimensional shape formed of a surface made up of a plurality of line elements 2. Conventionally, when the impeller 1 is machined, the direction of the central axis of a tool (not illustrated) when a lateral line of the tool follows the line elements 2 that form the blade surface 3 of the impeller 1 is not taken into consideration.

Japanese Patent Application Laid-Open No. 61-109608 indicates that a blade has a 3-dimensional shape formed of n line elements, and the blade is machined by aligning the axis of an endmill in the direction of the line elements. However, the direction of the central axis of the endmill for aligning with the line element is not taken into consideration, and 5-axis control is required in order to align the central axis of the endmill with a first line element and the n-th line element.

Japanese Patent Application Laid-Open No. 8-254198 indicates that a main blade has a 3-dimensional shape formed of two line elements and the main element is machined by aligning the central axis of an endmill in the direction of the line elements. However, this technique does not take the direction of the central axis of the endmill for aligning the line elements into consideration. Due to this, 5-axis control is required in order to align the central axis of the endmill with the respective two line elements similarly to Japanese Patent Application Laid-Open No. 61-109608.

Japanese Utility Model Application Laid-Open No. 4-54997 indicates that an impeller of which the blade surface is made up of line elements is fixed in a tilted manner and is 3-axis machined. However, since the line elements that form the blade surface are parallel to each other, this technique relates to machining of an impeller having a simple blade surface shape obtained by bending a flat surface, capable of machining a workpiece without rotating the workpiece.

Japanese Patent Application Laid-Open No. 2010-269417 discloses a method of machining an impeller using 4-axis machining having a tilted rotation axis.

International Publication WO 91/03648 discloses machining of such a blade surface that line elements that form the blade surface are parallel to a plane perpendicular to a rotation axis. However, WO 91/03648 does not disclose machining of such a blade surface that line elements that form the blade surface cross a plane perpendicular to a rotation axis.

In order to efficiently cut the blade surface of the impeller in a short time, the blade surface is formed of line elements that can be machined by a lateral surface of a tool. If the line elements are skew to each other, when the blade is machined by a lateral surface of the tool in a state where the lateral line of the tool follows the line elements that form the blade surface, the tool axis is tilted. Thus, it is necessary to machine the blade using a 5-axis machining machine. Moreover, when such a blade is machined using a 4-axis machining machine, it is not possible to machine the blade by the lateral surface of the tool, but it is necessary to machine the blade by a tip end of the tool.

SUMMARY OF THE INVENTION

An object of the present invention is to provide an impeller and a method of machining the same having such a blade formed of a surface made up of line elements that the blade can be machined using a lateral surface of the tool of a 4-axis machining machine even if the blade has such a shape that is formed of a surface made up of line elements skew to each other and that cannot be machined using a lateral surface of the tool of a 3-axis machining machine.

An impeller according to the present invention has a blade having a blade surface made up of line elements, and the line elements that form the blade surface of the impeller are not parallel to each other but are skew to each other. Here, an origin is defined at an optional position on a Z-axis which is a central axis of the impeller, and a plane that passes through the origin and is orthogonal to the Z-axis is defined as an XY plane, an X-axis is defined on the XY plane, and projection lines obtained by projecting the line elements onto the XY plane are defined as XY-projection lines of the line elements, an angle between the XY-projection line of each of the line elements and the X-axis is defined as a twist angle of the line element, a plane that includes the Z-axis and is not perpendicular to any one of the XY-projection lines of the line elements is defined as a Z-axis projection plane, projection lines obtained by projecting the line elements onto the Z-axis projection plane are defined as Z-axis projection lines of the line elements, and a distance between the origin and an intersection of the Z-axis and an extension line of the Z-axis projection line of each of the line elements is defined as a Z-axis distance of the line element.

In a first aspect of the impeller according to the present invention, the blade of the impeller is formed of a surface made up of such line elements that a relationship between the Z-axis distance of the line element and the twist angle of the line elements is represented by a curve, and that an angle between the Z-axis and the Z-axis projection line of the line element is not a right angle but the Z-axis projection lines of the line elements are parallel to each other.

In a second aspect of the impeller according to the present invention, the blade of the impeller is formed of a surface made up of such line elements that a relationship between the Z-axis distance of the line element and the twist angle of the line elements is represented by a curve, and that, when one lateral line of a cylindrical surface of a cylindrical tool is aligned with the line elements that form the blade surface, an angle between the central axis of the impeller and the Z-axis projection line of a central axis of the tool, which is a projection line obtained by projecting the central axis of the tool onto the Z-axis projection plane, is not a right angle but the Z-axis projection lines of the central axis of the tool are parallel to each other.

In a third aspect of the impeller according to the present invention, the blade of the impeller is formed of a surface made up of such line elements that a relationship between the Z-axis distance of the line element and the twist angle of the line elements is represented by a curve, and that, when one lateral line of a conical surface of a conical tool is aligned with the line elements that form the blade surface, an angle between the central axis of the impeller and the Z-axis projection line of a central axis of the tool, which is a projection line obtained by projecting the central axis of the tool onto the Z-axis projection plane, is not a right angle but the Z-axis projection lines of the central axis of the tool are parallel to each other.

A method of machining an impeller according to the present invention is a method of machining an impeller having a blade having a blade surface made up of line elements, using a 4-axis machining machine having three linear axes and one rotation axis, and the line elements that form the blade surface of the impeller are not parallel to each other but are skew to each other. Here, an origin is defined at an optional position on a Z-axis which is a central axis of the impeller, and a plane that passes through the origin and is orthogonal to the Z-axis is defined as an XY plane, an X-axis is defined on the XY plane, and projection lines obtained by projecting the line elements onto the XY plane are defined as XY-projection lines of the line elements, an angle between the XY-projection line of each of the line elements and the X-axis is defined as a twist angle of the line element, a plane that includes the Z-axis and is not perpendicular to any one of the XY-projection lines of the line elements is defined as a Z-axis projection plane, projection lines obtained by projecting the line elements onto the Z-axis projection plane are defined as Z-axis projection lines of the line elements, and a distance between the origin and an intersection of the Z-axis and an extension line of the Z-axis projection line of each of the line elements is defined as a Z-axis distance of the line element.

In a first aspect of the method of machining the impeller according to the present invention, the blade of the impeller is formed of a surface made up of such line elements that a relationship between the Z-axis distance of the line element and the twist angle of the line elements is represented by a curve, and that an angle between the Z-axis and the Z-axis projection line of the line element is not a right angle but the Z-axis projection lines of the line elements are parallel to each other. Moreover, the blade surface of the impeller is cut by a lateral surface of a cylindrical rotating tool in such a manner that a central axis of rotation of a workpiece is fixed to such a position that is tilted from a horizontal surface by an angle between a perpendicular of the central axis of the impeller and the Z-axis projection line of the line element, and that the workpiece is rotated in this state, the rotating tool is moved so that the lateral line thereof is aligned with the line element, and the workpiece is machined by the lateral surface of the rotating tool.

In a second aspect of the method of machining the impeller according to the present invention, the blade of the impeller is formed of a surface made up of such line elements that a relationship between the Z-axis distance of the line element and the twist angle of the line elements is represented by a curve, and that, when one lateral line of a cylindrical surface of a cylindrical tool is aligned with the line elements that form the blade surface, an angle between the central axis of the impeller and the Z-axis projection line of a central axis of the tool, which is a projection line obtained by projecting the central axis of the tool onto the Z-axis projection plane, is not a right angle but the Z-axis projection lines of the central axis of the tool are parallel to each other. Moreover, the blade surface of the impeller is cut by a lateral surface of a cylindrical rotating tool in such a manner that a central axis of rotation of a workpiece is fixed to such a position that is tilted from a horizontal surface by an angle between a perpendicular of the central axis of the impeller and the Z-axis projection line of the central axis of the tool when one lateral line of the rotating tool is aligned with the line elements that form the blade surface of the impeller, and that the workpiece is rotated in this state, the rotating tool is moved so that the lateral line thereof is aligned with the line element, and the workpiece is machined by the lateral surface of the rotating tool.

In a third aspect of the method of machining the impeller according to the present invention, the blade of the impeller is formed of a surface made up of such line elements that a relationship between the Z-axis distance of the line element and the twist angle of the line elements is represented by a curve, and that, when one lateral line of a conical surface of a conical tool is aligned with the line elements that form the blade surface, an angle between the central axis of the impeller and the Z-axis projection line of a central axis of the tool, which is a projection line obtained by projecting the central axis of the tool onto the Z-axis projection plane, is not a right angle but the Z-axis projection lines of the central axis of the tool are parallel to each other. Moreover, the blade surface of the impeller is cut by a lateral surface of a conical rotating tool in such a manner that a central axis of rotation of a workpiece is fixed to such a position that is tilted from a horizontal surface by an angle between a perpendicular of the central axis of the impeller and the Z-axis projection line of the central axis of the tool when one lateral line of the rotating tool is aligned with the line elements that form the blade surface of the impeller, and that the workpiece is rotated in this state, the rotating tool is moved so that the lateral line thereof is aligned with the line element, and the workpiece is machined by the lateral surface of the rotating tool.

According to the present invention, it is possible to provide an impeller and a method of machining the same having such a blade formed of a surface made up of line elements that the blade can be machined using a lateral surface of the tool of a 4-axis machining machine even if the blade has such a shape that is formed of a surface made up of line elements skew to each other and that cannot be machined using a lateral surface of the tool of a 3-axis machining machine. That is, due to the present invention, it is possible to form the blade of such an impeller that the blade can be machined using a lateral surface of the tool of a 4-axis machining machine even if the blade has such a shape that is formed of a surface made up of line elements skew to each other and that cannot be machined using a lateral surface of the tool of a 3-axis machining machine.

BRIEF DESCRIPTION OF THE DRAWINGS

The above and other objects and features of the present invention will be made apparent from the following description of embodiments in connection with the accompanying drawings, in which.

DESCRIPTION OF THE PREFERRED EMBODIMENTS

First, an impeller machining machine will be described with reference to FIGS. 1 and 2.

Figure 1:
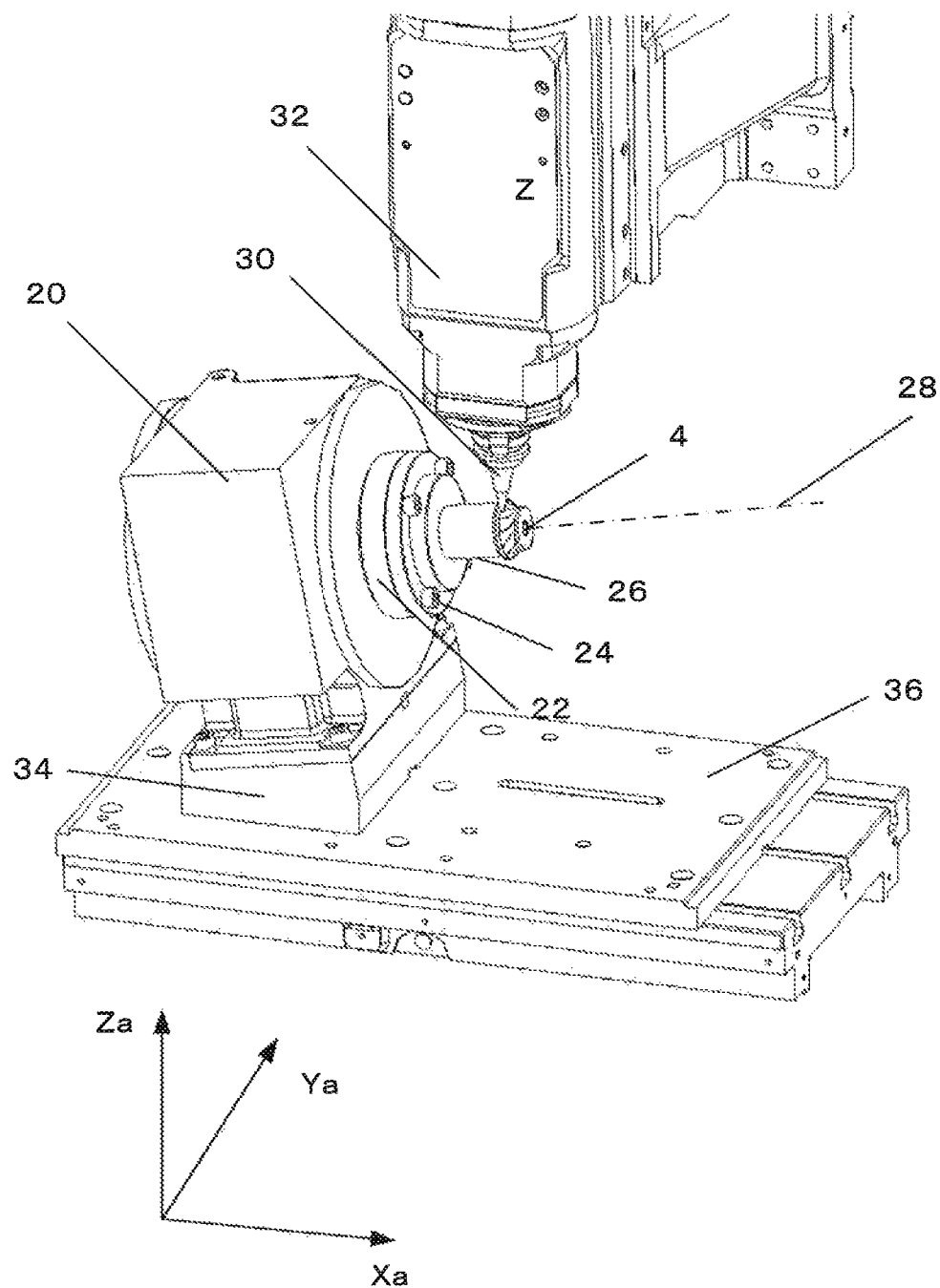
FIG. 1 is an external view illustrating a main part of an impeller machining machine having three linear axes (movable axes)
Figure 4:
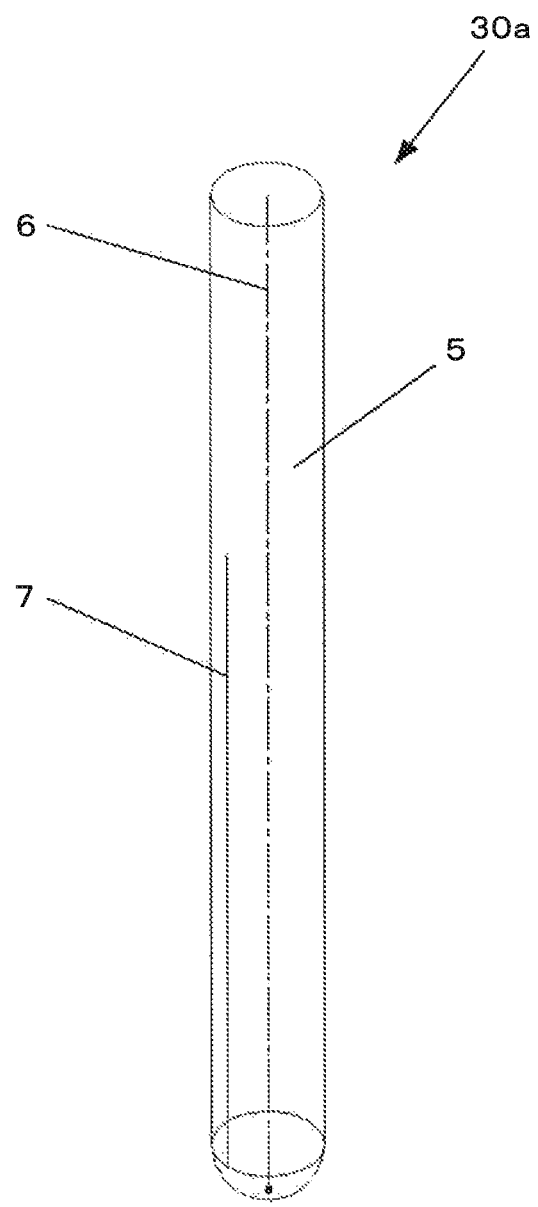
FIG. 4 is a diagram illustrating a first shape example of a tool used in the impeller machining machine illustrated in FIG. 1 in order to machine a blade surface of an impeller.
Figure 5:
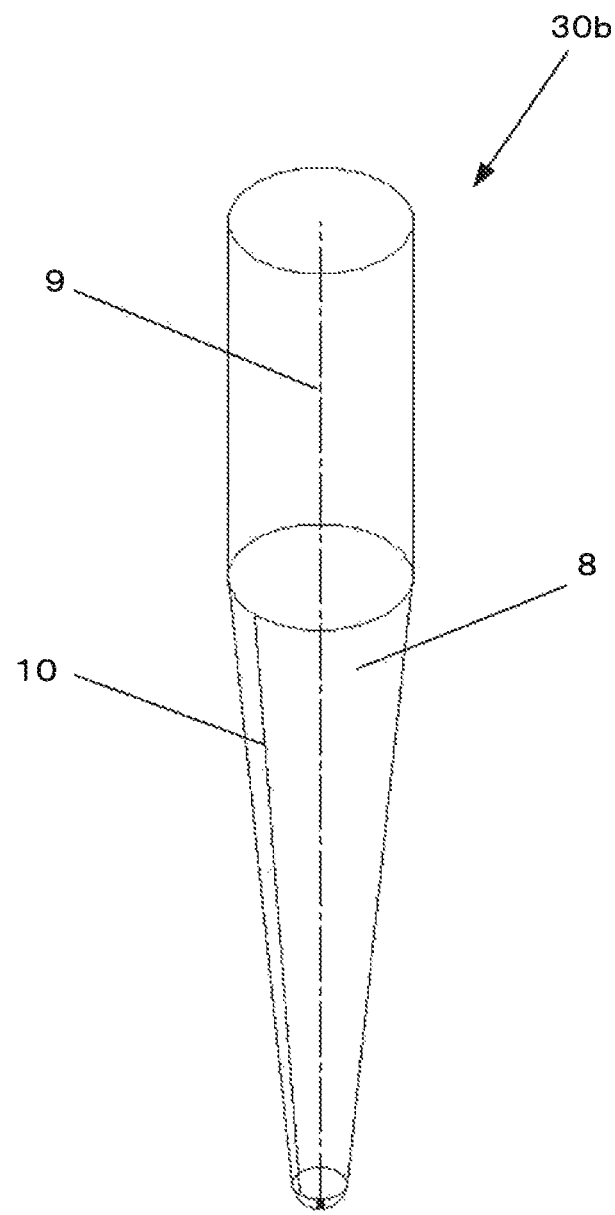
FIG. 5 is a diagram illustrating a second shape example of a tool used in the impeller machining machine illustrated in FIG. 1 in order to machine a blade surface of an impeller.

The impeller machining machine is a vertical machine tool as illustrated in FIG. 1, and reference numeral 32 denotes a spindle head of the machine tool. The vertical machine tool is a 4-axis machining machine having three linear axes (movable axes) including two horizontal axes (Xa and Ya-axes) and one vertical axis (Za-axis) and one rotation axis (C-axis). A tilting table 34 is attached to a mounting table 36, and a rotation table 20 is fixed to the tilting table 34. The rotation table 20 includes a disc 22 that rotates around the central axis of rotation 28 thereof. The central axis of rotation 28 is tilted in relation to the horizontal axis (Xa-axis). An adapter 26 for attaching a workpiece 4 is attached to the disc 22 by bolts 24. The workpiece 4 is attached to the adapter 26. The workpiece 4 is cut by a tool 30 whereby an impeller 70 (see FIG. 6) is obtained. Tools 30a and 30b of the types illustrated in FIGS. 4 and 5 are used as the tool 30 used for machining the blade surface of the impeller 70. The impeller machining machine may be formed using a horizontal machine tool rather than using the vertical machine tool illustrated in FIG. 1 as the impeller machining machine.

Figure 2:
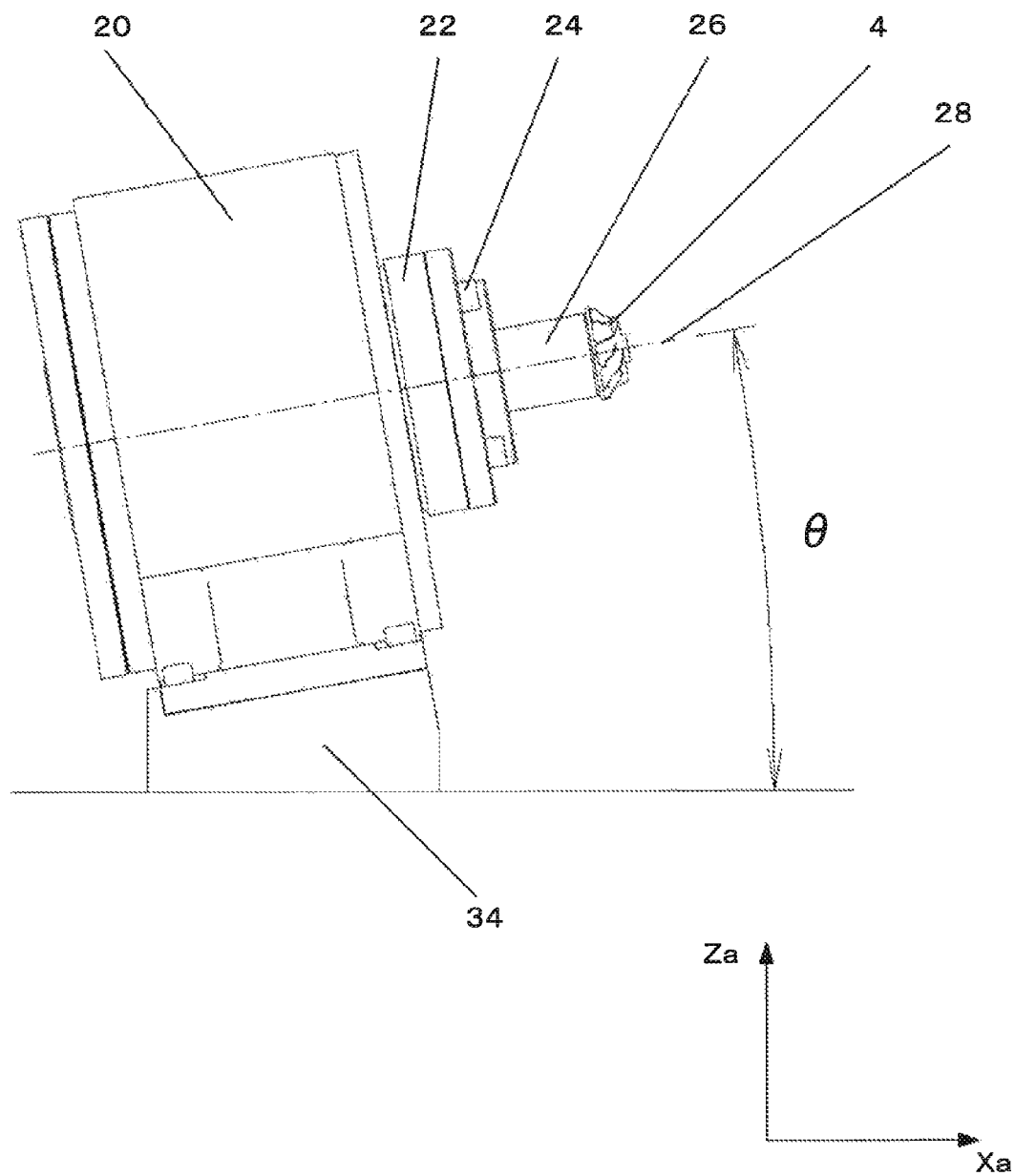
FIG. 2 is a side view of the impeller machining machine illustrated in FIG. 1 and is a view illustrating that a rotation table thereof is fixed to a tilting table and a central axis of rotation of a disc of the rotation table is tilted by an angle θ in relation to a horizontal axis (Xa-axis)

As illustrated in FIG. 2, the rotation table 20 of the impeller machining machine is fixed to the tilting table 34, and the central axis of rotation 28 of the disc 22 of the rotation table 20 is tilted by an angle θ in relation to the horizontal axis (Xa-axis). The disc 22 having the adapter 26 rotates around the central axis of rotation 28. The workpiece 4 is attached to one end of the adapter 26.

Figure 3:
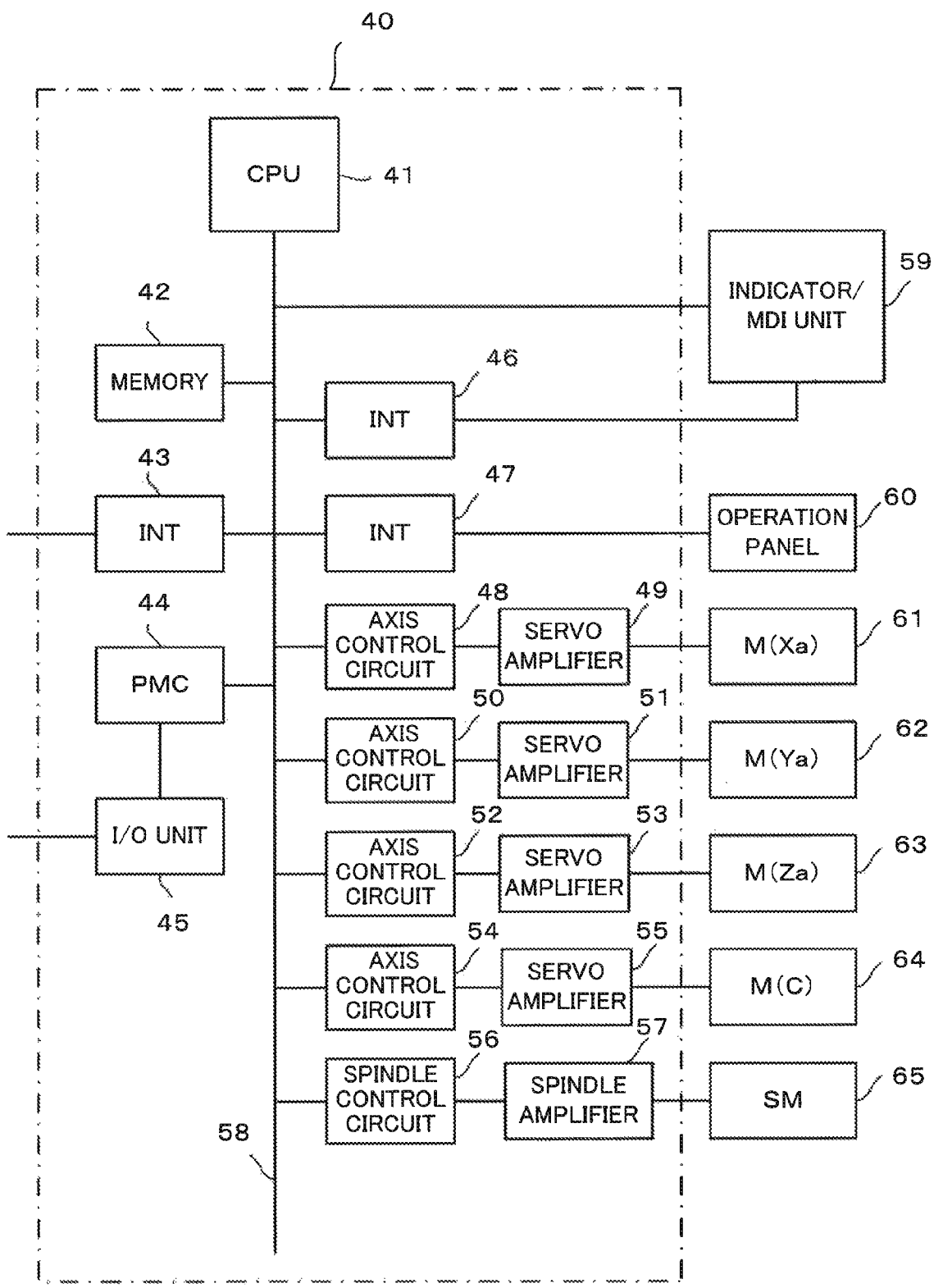
FIG. 3 is a schematic diagram illustrating a configuration of a numerical controller for 4-axis machining machines for controlling the impeller machining machine illustrated in FIG. 1.

The impeller machining machine (machine tool) illustrated in FIG. 1 is controlled by a numerical controller for 4-axis machining machines illustrated in FIG. 3.

A CPU 41 reads a system program stored in a ROM area of a memory 42 via a bus 58 and controls an entire numerical controller 40 according to the system program. Temporary computation data, display data, and various types of data input by an operator via a display/manual data input (MDI) unit 59 are stored in a RAM area of the memory 42. Moreover, a machining program read via an interface 43, a machining program input via the display/MDI unit 59, and the like are stored in a nonvolatile memory area configured as a SRAM or the like, of the memory 42.

The interface 43 allows the numerical controller 40 to be connected to an external apparatus (not illustrated) such as an adapter or the like. The machining program, various parameters, and the like are read from the external apparatus. Moreover, the machining program edited by the numerical controller 40 can be stored in external storage means via an external apparatus (not illustrated). A programmable machine controller (PMC) 44 outputs signals to an auxiliary device of the machine tool via an I/O unit according to a sequence program installed in the numerical controller 40 and controls the machine tool. Moreover, the PMC 44 receives signals of various switches or the like of an operation panel disposed in a machine tool body, performs necessary signal processing on the signals, and then, sends the processed signals to the CPU 41.

The display/MDI unit 59 is a manual data input device having a display, a keyboard, and the like, and the interface 46 receives commands and data from the keyboard of the display/MDI unit 59 and sends the commands and data to the CPU 41. The interface 47 is connected to an operation panel 60 having a manual pulse generator and the like.

Axis control circuits 48, 50, 52, and 54 of the respective axes (three linear axes Xa, Ya, and Za and one rotation axis C) receive movement commands for the respective axes from the CPU 41 and output the commands for the respective axes to servo amplifiers 49, 51, 53, and 55, respectively. These servo amplifiers 49, 51, 53, and 55 receive these commands and drive servo motors 61, 62, 63, and 64 of the respective axes, respectively. The respective axes are subjected to position and speed feedback control (this configuration is not illustrated in FIG. 3).

The servo motors 61, 62, 63, and 64 drive the Xa, Ya, Za, and C axes of the machine tool and control the driving of the 4-axis machining machine illustrated in FIG. 1. Moreover, a spindle control circuit 56 receives a spindle rotation command and outputs a spindle speed signal to a spindle amplifier 57. The spindle amplifier 57 receives the spindle speed signal to cause a spindle motor 65 to rotate at the instructed rotation speed.

The numerical controller 40 for 4-axis machining machines performs 4-axis control of moving a blade which is a tool using the three linear axes Xa, Ya, and Za and rotating the workpiece 4 around one rotation axis (C-axis) to thereby machine the entire blade surface of the impeller. A 4-axis command machining program is used in the 4-axis control of the numerical controller 40 for 4-axis machining machines.

Next, first and second shape examples of the tool used in the impeller machining machine illustrated in FIG. 1 in order to machine the blade surface of the impeller will be described with reference to FIGS. 4 and 5.

The tool according to the first shape example illustrated in FIG. 4 is a tool 30*a* having a cylindrical surface 5, and the tool 30*a* has the cylindrical surface 5 around a central axis 6 and machines the workpiece 4 using a lateral line 7 of the cylinder of the tool 30*a*. On the other hand, the tool according to the second shape example illustrated in FIG. 5 is a tool 30*b* having a conical surface 8, and the tool 30*b* has the conical surface 8 around a central axis 9 and machines the workpiece 4 using a lateral line 10 of the cone of the tool 30*b*.

The impeller machined using the impeller machining machine which is the 4-axis machining machine will be described. As described above, the object of the present invention is to provide an impeller and a method of machining the same having such a blade formed of a surface made up of line elements that the blade can be machined using a lateral surface of the tool of a 4-axis machining machine even if the blade has such a shape that is formed of a surface made up of line elements skew to each other and that cannot be machined using a lateral surface of the tool of a 3-axis machining machine. Due to this, the blade surface of the impeller is formed of such line elements that, when one lateral line of the cylinder or the cone of the cylindrical or conical rotating tool is arranged so as to follow the line elements of the blade surface of the impeller and the line element or the central axis of the cylinder or the cone is projected onto a plane including the central axis of the impeller, the projection lines are parallel to each other.

Hereinafter, the shapes of the impeller according to the respective embodiments and a method of machining the impeller will be described.

First, a first embodiment of the impeller and the method of machining the impeller according to the present invention will be described with reference to FIGS. 6 to 9.

Figure 6:
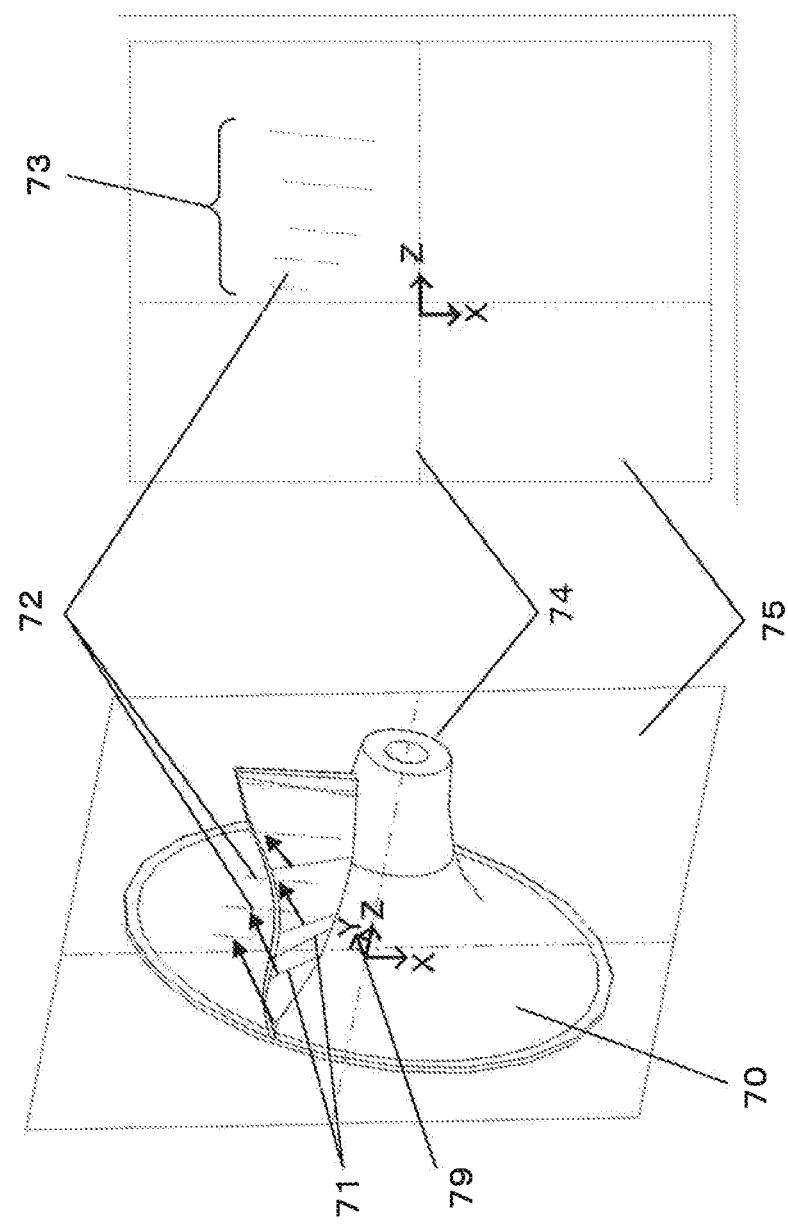
FIG. 6 is a diagram illustrating a first embodiment of an impeller and a method of machining the impeller according to the present invention and illustrates Z-axis projection lines of line elements that form a blade surface.

As illustrated in FIG. 6, in the blade of an impeller 70, line elements 71 that form the blade surface are not parallel to each other but are skew to each other.

Figure 7:
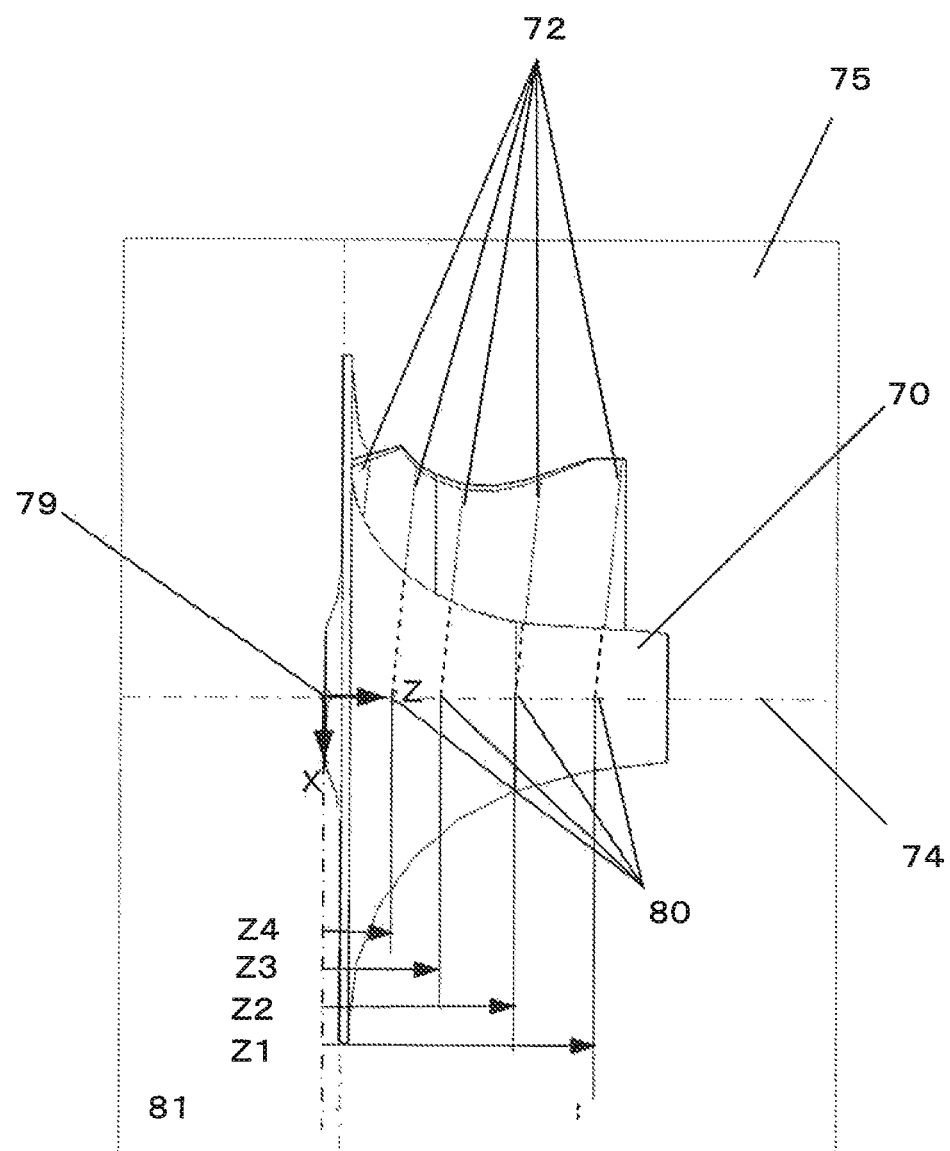
FIG. 7 is a view of line elements that form the blade surface of the impeller illustrated in FIG. 6 as viewed from a lateral surface of the impeller.
Figure 8:
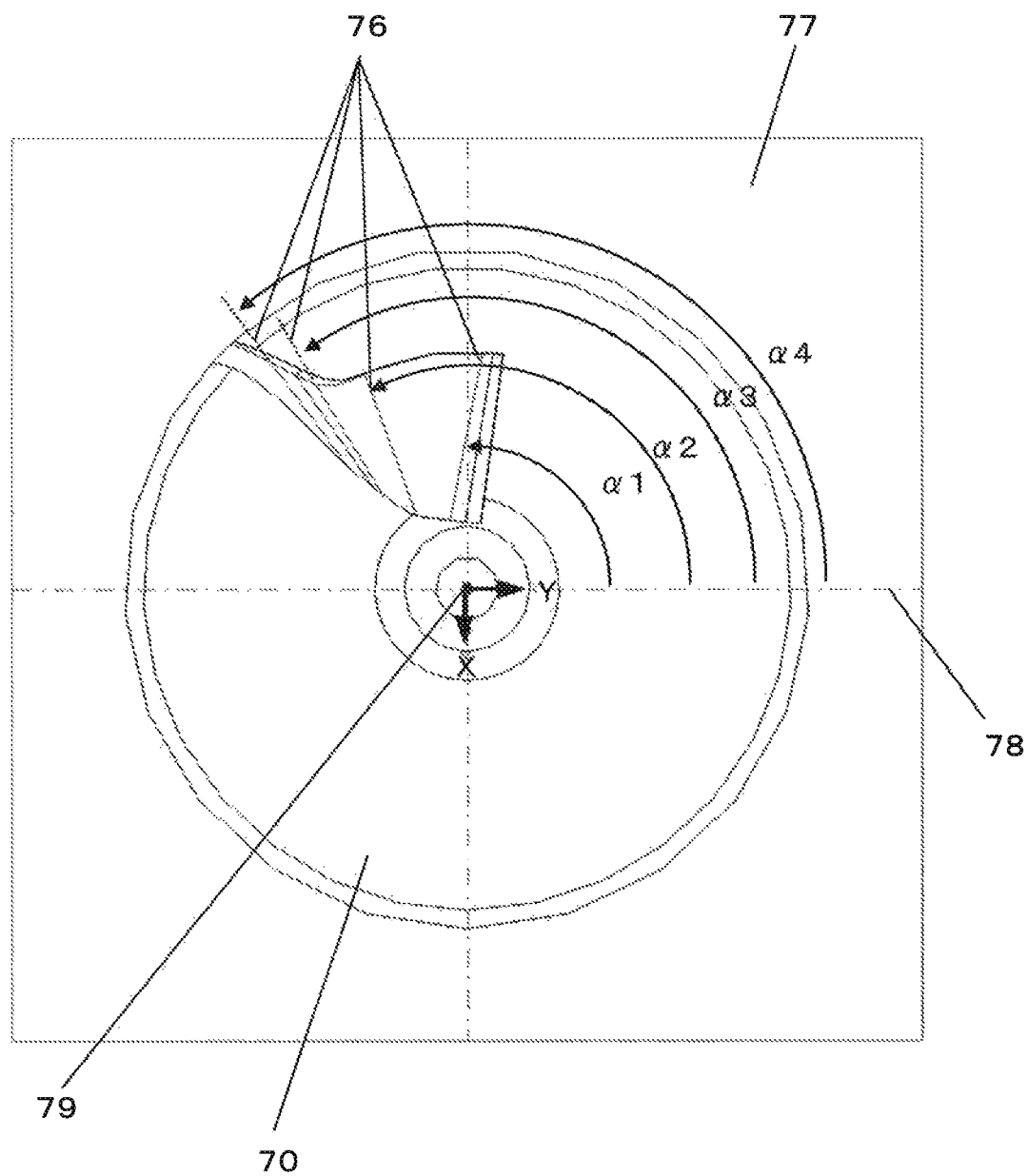
FIG. 8 is a view of line elements that form the blade surface of the impeller illustrated in FIG. 6 as viewed from the direction of a central line (Z-axis) of the impeller.

As illustrated in FIG. 7, the origin 79 is defined at a predetermined position on a Z-axis 74 which is the central axis of the impeller 70, and a plane that passes through the origin 79 and is orthogonal to the Z-axis 74 is defined as an XY plane 77 as illustrated in FIG. 8. An X-axis 78 is defined on the XY plane 77. Projection lines of line elements 71 that form the blade surface of the blade of the impeller 70 when projected onto the XY plane 77 are defined as XY-projection lines 76. The angle between the XY-projection line 76 and the X-axis 78 is referred to as a line element twist angle α (FIG. 8 illustrates α1, α2, α3, and α4 as the line element twist angles).

As illustrated in FIG. 6, a plane that includes the Z-axis 74 and is not perpendicular to any XY-projection line 76 of the line elements 71 that form the blade surface of the blade of the impeller 70 is defined as a Z-axis projection plane 75. As illustrated in FIG. 7, projection lines of the line elements 71 that form the blade surface of the blade of the impeller 70 (hereinafter, the line elements 71 that form the blade surface of the blade of the impeller 70 will be referred to simply as "line elements 71") when projected onto the Z-axis projection plane 75 are defined as Z-axis projection lines 72 of the line elements. Further, as illustrated in FIG. 7, the distance between the origin 79 and an intersection 80 of the extension line of the Z-axis projection line 72 of the line element and the Z-axis 74 which is the central axis of the impeller 70 is defined as a Z-axis distance 81 of the line element (FIG. 7 illustrates Z1, Z2, Z3, and Z4 as the Z-axis distances 81 of the line elements).

Figure 9:
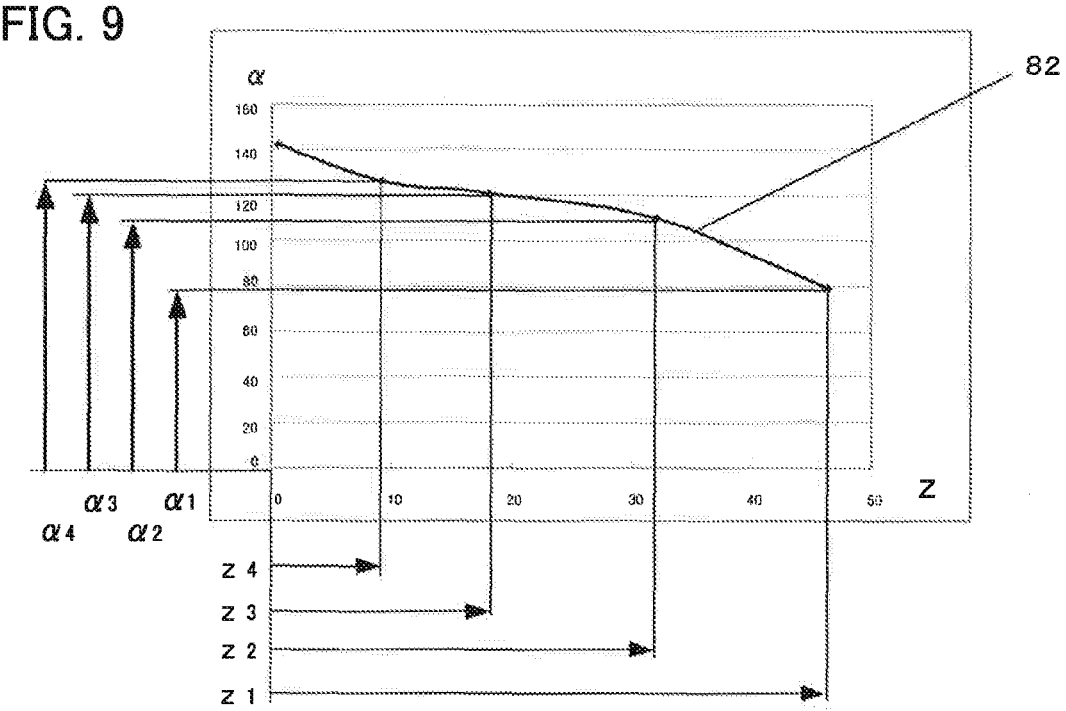
FIG. 9 is a view illustrating relationship between a twist angle α and a Z-axis distance Z in the blade surface of the impeller illustrated in FIG. 6.

The blade of the impeller 70 is formed of a surface made up of such line elements that the relationship between the Z-axis distance 81 of the line element and the twist angle α of the line elements is represented by a curve 82 illustrated in FIG. 9 and that the angle between the Z-axis projection lines 72 of the line elements and the Z-axis 74 is not a right angle but the Z-axis projection lines 72 of the line elements are parallel to each other.

Figure 10:
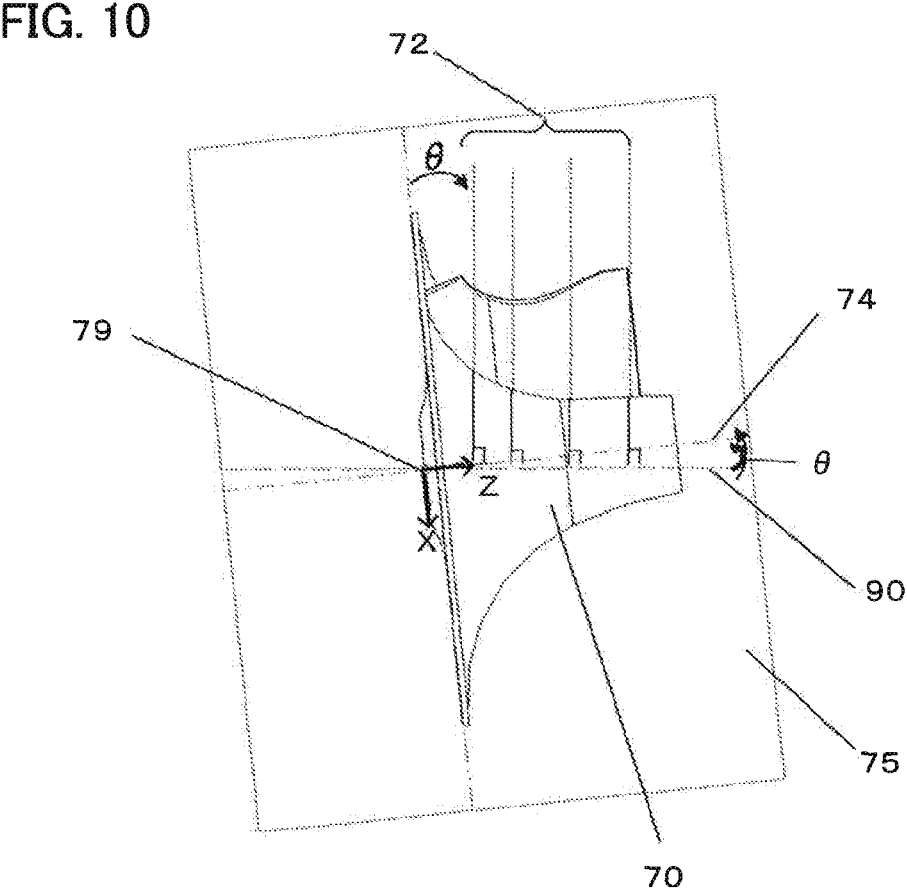
FIG. 10 is a diagram illustrating a method of machining the impeller illustrated in FIG. 6.

FIG. 10 is a diagram illustrating a method of machining the impeller according to the first embodiment (FIG. 5).

The impeller 70 is machined using a 4-axis machining machine having three linear axes and one rotation axis. The blade surface of the impeller 70 is cut by a lateral surface of the cylindrical rotating tool 30*a* (FIG. 4) in the following manner. The central axis of rotation of a workpiece is fixed to such a position that is tilted from a horizontal surface 90 by the angle θ between the projection line (the Z-axis projection line 72 of the line element) of the line element 71 when projected onto the Z-axis projection plane 75 including the central axis (the Z-axis 74) of the impeller 70 and a perpendicular of the central axis (the Z-axis 74) of the impeller 70. In this state, the workpiece is rotated, the cylindrical rotating tool (the tool 30*a*) is moved so that the lateral line is aligned with the line element 71, and the workpiece is machined by the lateral surface of the tool 30*a*.

Next, the second embodiment of the impeller and the method of machining the impeller according to the present invention will be described with reference to FIGS. 11 and 12.

Figure 11:
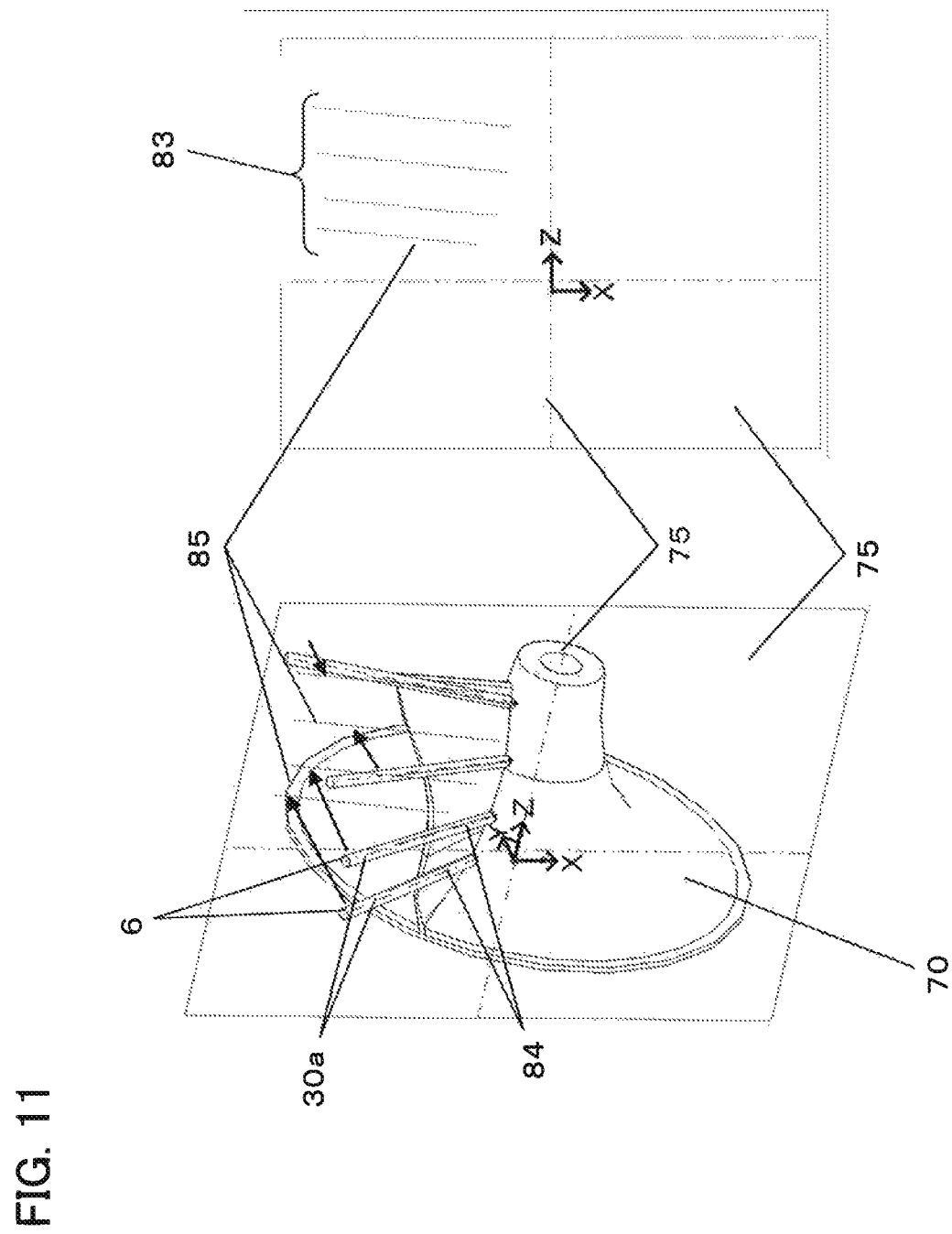
FIG. 11 is a diagram illustrating a Z-axis projection line of the central axis of the tool illustrated in FIG. 4 having a cylindrical surface in a second embodiment of an impeller and a method of machining the impeller according to the present invention.

FIG. 11 is a diagram illustrating a Z-axis projection line of the central axis of a tool having a cylindrical surface according to this embodiment.

An impeller 70 has a blade having a blade surface made up of line elements 71 being skew to each other rather than the line elements being parallel to each other similarly to those illustrated in FIGS. 6 to 9. The origin 79 is defined at a predetermined position on the Z-axis 74 which is the central axis of the impeller 70, and a plane that passes through the origin 79 and is orthogonal to the Z-axis 74 is defined as an XY plane 77. An X-axis 78 is defined on the XY plane 77. Projection lines of line elements 71 that form the blade surface of the blade of the impeller 70 when projected onto the XY plane 77 are defined as XY-projection lines 76 of the line elements. The angle between the XY-projection line 76 of the line element and the X-axis 78 is referred to as a line element twist angle α.

As illustrated in FIG. 11, a plane that includes the Z-axis 74 and is not perpendicular to any XY-projection line 76 of the line elements 71 that form the blade surface of the blade of the impeller 70 is defined as a Z-axis projection plane 75. As illustrated in FIG. 12, projection lines of the line elements 71 when projected onto the Z-axis projection plane 75 are defined as Z-axis projection lines 72 of the line elements. Further, the distance between the origin 79 and an intersection 80 of the extension line of the Z-axis projection line 72 of the line element and the Z-axis 74 which is the central axis of the impeller 70 is defined as a Z-axis distance 81 of the line element.

The blade of the impeller 70 is formed of a surface made up of such line elements that the relationship between the Z-axis distance 81 of the line element and the twist angle α of the line elements is represented by a curve and that the angle between the impeller central axis (the Z-axis 74) and the projection line (the Z-axis projection line of the tool central axis) 85 obtained by projecting the central axis 6 of the tool 30*a* onto the Z-axis projection plane 75 when one lateral line of the cylinder of the tool 30*a* is aligned with the line element 71 is not a right angle but the projection lines 85 of the tool central axis are parallel to each other.

In FIG. 11, reference numeral 84 denotes a state where one lateral line of the cylinder of the tool 30*a* follows the line element 71.

Figure 12:
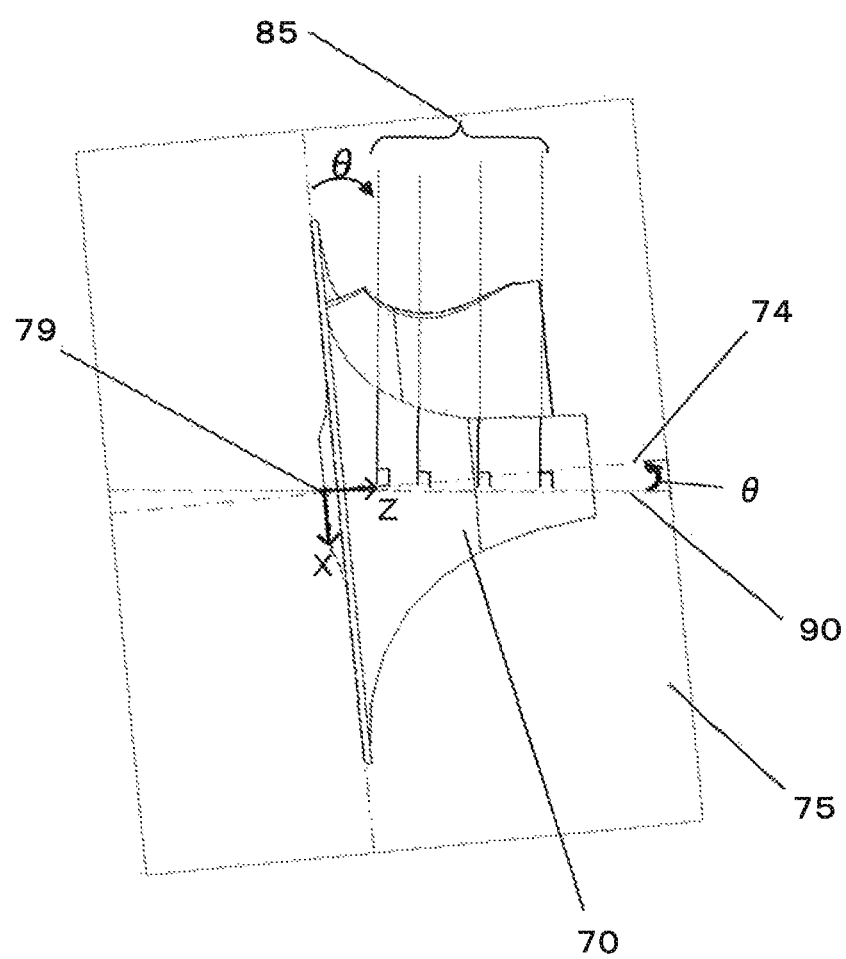
FIG. 12 is a diagram illustrating the second embodiment of the method of machining the impeller according to the present invention.

FIG. 12 is a diagram illustrating a method of machining an impeller according to this embodiment.

The impeller 70 is machined using a 4-axis machining machine having three linear axes and one rotation axis. The blade surface of the impeller 70 is cut by a lateral surface of the cylindrical rotating tool 30*a* (FIG. 4) in the following manner. The central axis of rotation of a workpiece is fixed to such a position that is tilted from a horizontal surface 90 by the angle θ between a perpendicular of the central axis (the Z-axis 74) of the impeller 70 and the projection line (the Z-axis projection line 85 of the tool central axis) obtained by projecting the central axis 6 of the tool onto the Z-axis projection plane 75 when one lateral line 7 (FIG. 4) of the cylinder of the tool 30*a* is aligned with the line elements 71 that form the blade surface of the impeller 70. In this state, the workpiece is rotated, the rotating tool 30*a* is moved so that the lateral line of the rotating tool 30*a* is aligned with the line element 71, and the workpiece is machined by the lateral surface of the tool 30*a*.

In FIG. 12, reference numeral 86 denotes a state where one lateral line of the cylinder of the tool 30*b* follows the line element 71.

Next, a third embodiment of the impeller and the method of machining the impeller according to the present invention will be described with reference to FIGS. 13 and 14.

Figure 13:
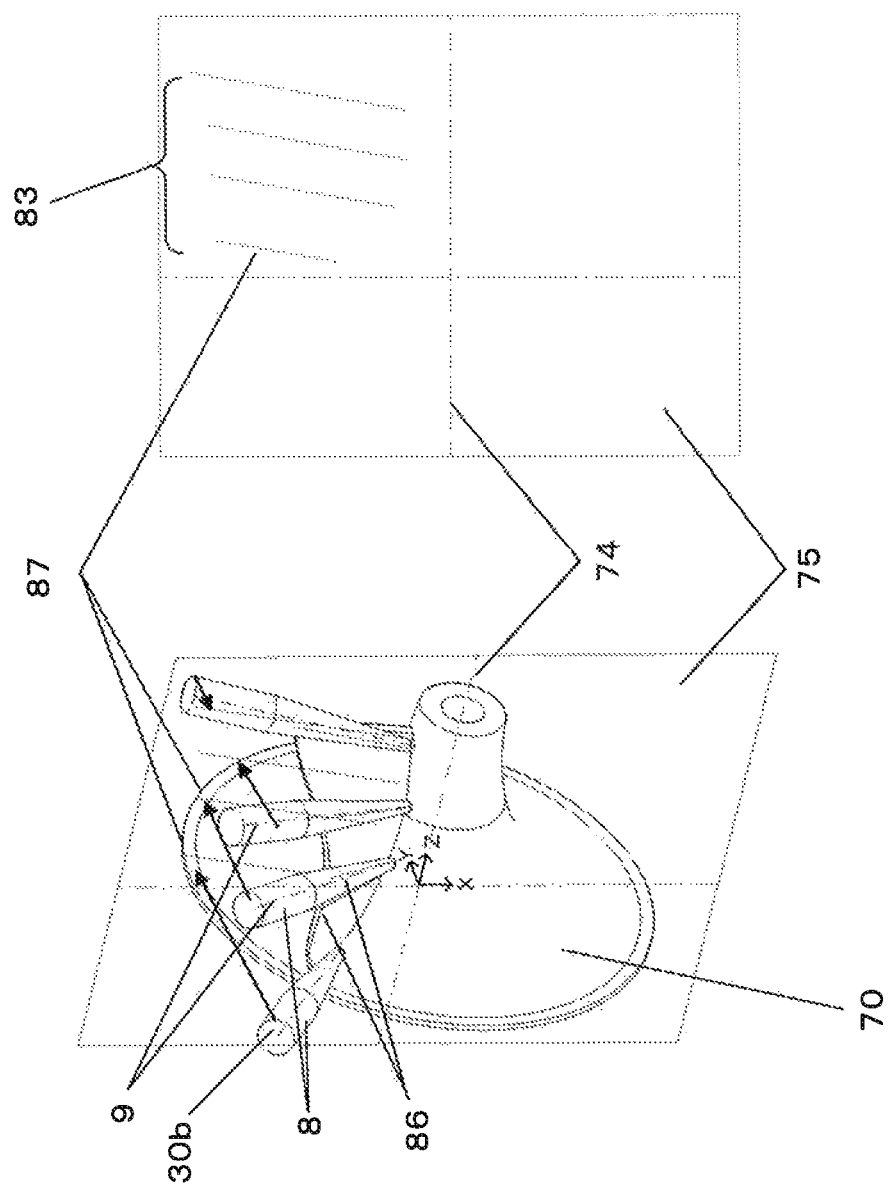
FIG. 13 is a diagram illustrating a Z-axis projection line of a central axis of the tool illustrated in FIG. 5 having a conical surface in a third embodiment of the impeller and a method of machining the impeller according to the present invention.

FIG. 13 is a diagram illustrating a Z-axis projection line of the central axis of a tool having a conical surface according to this embodiment.

An impeller 70 has a blade having a blade surface made up of line elements 71 being skew to each other rather than the line elements being parallel to each other similarly to those illustrated in FIGS. 6 to 9. The origin 79 is defined at a predetermined position on the Z-axis 74 which is the central axis of the impeller 70, and a plane that passes through the origin 79 and is orthogonal to the Z-axis 74 is defined as an XY plane 77. An X-axis 78 is defined on the XY plane 77. Projection lines of line elements 71 that form the blade surface of the blade of the impeller 70 when projected onto the XY plane 77 are defined as XY-projection lines 76 of the line elements. The angle between the XY-projection line 76 of the line element and the X-axis 78 is referred to as a line element twist angle α.

Moreover, a plane that includes the Z-axis 74 and is not perpendicular to any XY-projection line 76 of the line elements 71 that form the blade surface of the blade of the impeller 70 is defined as a Z-axis projection plane 75.

Projection lines of the line elements 71 when projected onto the Z-axis projection plane 75 are defined as Z-axis projection lines 72 of the line elements. Further, the distance between the origin 79 and an intersection 80 of the extension line of the Z-axis projection line 72 of the line element and the Z-axis 74 is defined as a Z-axis distance 81 of the line element.

The blade of the impeller 70 is formed of a surface made up of such line elements that the relationship between the Z-axis distance 81 of the line element and the twist angle α of the line elements is represented by a curve and that the angle between the impeller central axis 9 and the projection line (the Z-axis projection line of the tool central axis) 87 obtained by projecting the central axis 9 of the tool 30*b* onto the Z-axis projection plane 75 when a lateral line 10 (FIG. 5) of the conical surface of the tool 30*b* is aligned with the line element 71 is not a right angle but the projection lines 87 of the tool central axis are parallel to each other.

Figure 14:
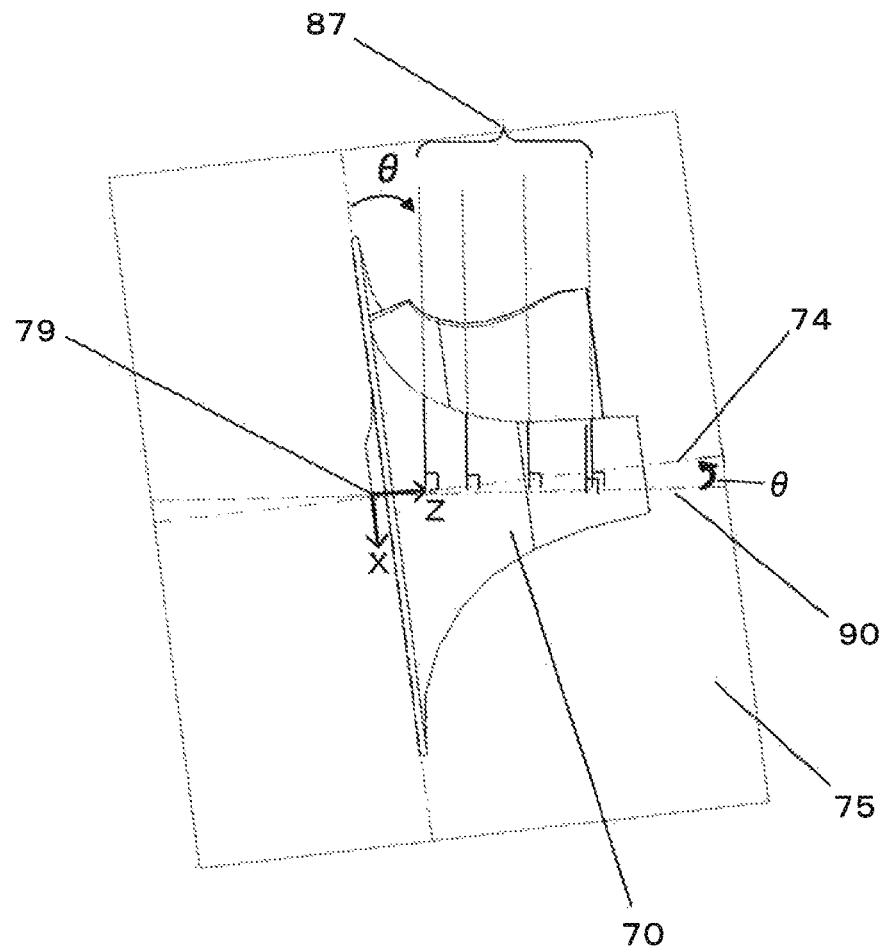
FIG. 14 is a diagram illustrating the third embodiment of the method of machining the impeller according to the present invention.
Figure 15:
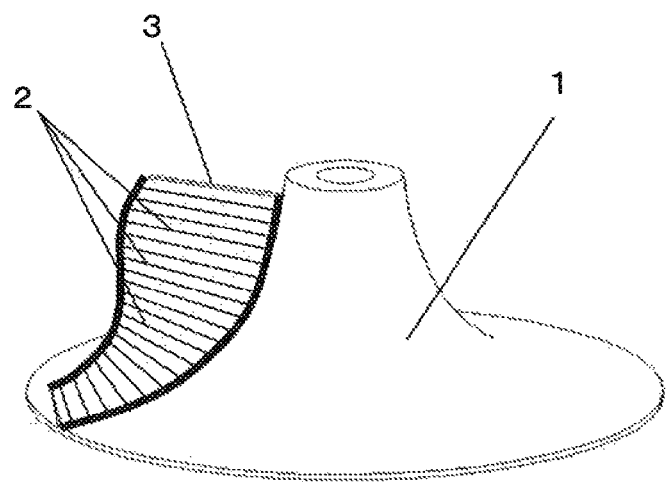
FIG. 15 is a diagram illustrating an example of a conventional impeller having general blades.

FIG. 14 is a diagram illustrating a method of machining an impeller according to this embodiment.

The impeller 70 is machined using a 4-axis machining machine having three linear axes and one rotation axis. The blade surface of the impeller 70 is cut by a lateral surface of the cylindrical rotating tool 30*b* (FIG. 5) in the following manner. The central axis of rotation of a workpiece is fixed to such a position that is tilted from a horizontal surface 90 by the angle θ between a perpendicular of the central axis (the Z-axis 74) of the impeller 70 and the projection line (the Z-axis projection line 76 of the line element) obtained by projecting the central axis 9 of the tool 30*b* onto the Z-axis projection plane 75 when one lateral line 10 (FIG. 5) of the conical surface of the tool 30*b* is aligned with the line elements 71 that form the blade surface of the impeller 70. In this state, the workpiece is rotated, the rotating tool 30*b* is moved so that the lateral line of the rotating tool 30*b* is aligned with the line element 71, and the workpiece is machined by the lateral surface of the tool 30*b*.

What is claimed is:

1. A method of machining an impeller having a blade having a blade surface made up of line elements, using a 4-axis machining machine having three linear axes and one rotation axis, the line elements that form the blade surface of the impeller being not parallel to each other but being skew to each other, an origin being defined at an optional position on a Z-axis which is a central axis of the impeller, and a plane that passes through the origin and is orthogonal to the Z-axis being defined as an XY plane, an X-axis being defined on the XY plane, and projection lines obtained by projecting the line elements onto the XY plane being defined as XY-projection lines of the line elements, an angle between the XY-projection line of each of the line elements and the X-axis being defined as a twist angle of the line element, a plane that includes the Z-axis and is not perpendicular to any one of the XY-projection lines of the line elements being defined as a Z-axis projection plane, projection lines obtained by projecting the line elements onto the Z-axis projection plane being defined as Z-axis projection lines of the line elements, a distance between the origin and an intersection of the Z-axis and an extension line of the Z-axis projection line of each of the line elements being defined as a Z-axis distance of the line element, and the blade of the impeller being formed of a surface made up of such line elements that a relationship between the Z-axis distance of the line element and the twist angle of the line elements is represented by a curve, and that an angle between the Z-axis and the Z-axis projection line of the line element is not a right angle but the Z-axis projection lines of the line elements are parallel to each other, the method comprising, when cutting the blade surface of the impeller by a lateral surface of a cylindrical rotating tool having a central rotational axis:

fixing a central axis of rotation of a workpiece to such a position that is tilted from a horizontal surface by an angle between a perpendicular of the central axis of the impeller and the Z-axis projection line of the line element;

rotating the workpiece in this state;

moving the rotating tool so that the lateral line thereof is aligned with the line element; and machining the workpiece by the lateral surface of the rotating tool, wherein the central rotational axis of the cylindrical rotating tool is held at a predetermined angle relative to the Z-axis across an entirety of the blade surface between two of the line elements that form the blade surface, and said predetermined angle being equal to an angle between one of the line elements that form the blade surface and the Z-axis, and the predetermined angle is not a right angle.

2. A method of machining an impeller having a blade having a blade surface made up of line elements, using a 4-axis machining machine having three linear axes and one rotation axis, the line elements that form the blade surface of the impeller being not parallel to each other but being skew to each other, an origin being defined at an optional position on a Z-axis which is a central axis of the impeller, and a plane that passes through the origin and is orthogonal to the Z-axis being defined as an XY plane, an X-axis being defined on the XY plane, and projection lines obtained by projecting the line elements onto the XY plane being defined as XY-projection lines of the line elements, an angle between the XY-projection line of each of the line elements and the X-axis being defined as a twist angle of the line element, a plane that includes the Z-axis and is not perpendicular to any one of the XY-projection lines of the line elements being defined as a Z-axis projection plane, projection lines obtained by projecting the line elements onto the Z-axis projection plane being defined as Z-axis projection lines of the line elements, a distance between the origin and an intersection of the Z-axis and an extension line of the Z-axis projection line of each of the line elements being defined as a Z-axis distance of the line element, and the blade of the impeller being formed of a surface made up of such line elements that a relationship between the Z-axis distance of the line element and the twist angle of the line elements is represented by a curve, and that, when one lateral line of a cylindrical surface of a cylindrical tool is aligned with the line elements that form the blade surface, an angle between the central axis of the impeller and the Z-axis projection line of a central axis of the tool, which is a projection line obtained by projecting the central axis of the tool onto the Z-axis projection plane, is not a right angle but the Z-axis projection lines of the central axis of the tool are parallel to each other, the method comprising, when cutting the blade surface of the impeller by a lateral surface of a cylindrical rotating tool having a central rotational axis:

fixing a central axis of rotation of a workpiece to such a position that is tilted from a horizontal surface by an angle between a perpendicular of the central axis of the impeller and the Z-axis projection line of the central axis of the tool when one lateral line of the rotating tool is aligned with the line elements that form the blade surface of the impeller;

rotating the workpiece in this state;

moving the rotating tool so that the lateral line thereof is aligned with the line element; and machining the workpiece by the lateral surface of the rotating tool, wherein the central rotational axis of the cylindrical rotating tool is held at a predetermined angle relative to the Z-axis across an entirety of the blade surface between two of the line elements that form the blade surface, and said predetermined angle being equal to an angle between one of the line elements that form the blade surface and the Z-axis, and the predetermined angle is not a right angle.

3. A method of machining an impeller having a blade having a blade surface made up of line elements, using a 4-axis machining machine having three linear axes and one rotation axis, the line elements that form the blade surface of the impeller being not parallel to each other but being skew to each other, an origin being defined at an optional position on a Z-axis which is a central axis of the impeller, and a plane that passes through the origin and is orthogonal to the Z-axis being defined as an XY plane, an X-axis being defined on the XY plane, and projection lines obtained by projecting the line elements onto the XY plane being defined as XY-projection lines of the line elements, an angle between the XY-projection line of each of the line elements and the X-axis being defined as a twist angle of the line element, a plane that includes the Z-axis and is not perpendicular to any one of the XY-projection lines of the line elements being defined as a Z-axis projection plane, projection lines obtained by projecting the line elements onto the Z-axis projection plane being defined as Z-axis projection lines of the line elements, a distance between the origin and an intersection of the Z-axis and an extension line of the Z-axis projection line of each of the line elements being defined as a Z-axis distance of the line element, and the blade of the impeller being formed of a surface made up of such line elements that a relationship between the Z-axis distance of the line element and the twist angle of the line elements is represented by a curve, and that, when one lateral line of a conical surface of a conical tool is aligned with the line elements that form the blade surface, an angle between the central axis of the impeller and the Z-axis projection line of a central axis of the tool, which is a projection line obtained by projecting the central axis of the tool onto the Z-axis projection plane, is not a right angle but the Z-axis projection lines of the central axis of the tool are parallel to each other, the method comprising, when cutting the blade surface of the impeller by a lateral surface of a conical rotating tool having a central rotational axis:

fixing a central axis of rotation of a workpiece to such a position that is tilted from a horizontal surface by an angle between a perpendicular of the central axis of the impeller and the Z-axis projection line of the central axis of the tool when one lateral line of the rotating tool is aligned with the line elements that form the blade surface of the impeller;

rotating the workpiece in this state;
moving the rotating tool so that the lateral line thereof is aligned with the line element; and
machining the workpiece by the lateral surface of the rotating tool, wherein
the central rotational axis of the conical rotating tool is held at a predetermined angle relative to the Z-axis across an entirety of the blade surface between two of the line elements that form the blade surface, and
said predetermined angle being equal to an angle between one of the line elements that form the blade surface and the Z-axis, and the predetermined angle is not a right angle.

* * * * *